US 9,979,753 B2

(12) United States Patent
Chesla

(10) Patent No.: US 9,979,753 B2
(45) Date of Patent: *May 22, 2018

(54) CYBER-SECURITY SYSTEM AND METHODS THEREOF

(71) Applicant: Empow Cyber Security Ltd., Ramat Gan (IL)

(72) Inventor: Avi Chesla, Tel-Aviv (IL)

(73) Assignee: Empow Cyber Security Ltd., Ramat Gan (IL)

(*) Notice: Subject to any disclaimer, the term of this patent is extended or adjusted under 35 U.S.C. 154(b) by 0 days. days.

This patent is subject to a terminal disclaimer.

(21) Appl. No.: 15/395,009

(22) Filed: Dec. 30, 2016

(65) Prior Publication Data

US 2017/0111396 A1  Apr. 20, 2017

Related U.S. Application Data

(63) Continuation of application No. 14/615,020, filed on Feb. 5, 2015, now Pat. No. 9,565,204.

(60) Provisional application No. 62/085,844, filed on Dec. 1, 2014, provisional application No. 62/026,393, filed on Jul. 18, 2014.

(51) Int. Cl.
   *H04L 29/06* (2006.01)

(52) U.S. Cl.
   CPC ............ *H04L 63/20* (2013.01); *H04L 63/145* (2013.01); *H04L 63/1416* (2013.01)

(58) Field of Classification Search
   CPC . H04L 63/02; H04L 63/1408; H04L 63/1441; H04L 63/1425; H04L 63/1416
   USPC .......................................................... 726/23
   See application file for complete search history.

(56) References Cited

U.S. PATENT DOCUMENTS

| 7,930,746 | B1 | 4/2011 | Sheleheda et al. |
| 7,933,989 | B1 | 4/2011 | Barker et al. |
| 8,150,783 | B2 | 4/2012 | Gonsalves et al. |
| 8,572,750 | B2 | 10/2013 | Patel et al. |
| 8,800,045 | B2 | 8/2014 | Curtis et al. |
| 9,565,204 | B2 * | 2/2017 | Chesla ................ H04L 63/02 726/23 |
| 9,628,507 | B2 | 4/2017 | Haq et al. |

(Continued)

FOREIGN PATENT DOCUMENTS

CN    102262716 A    11/2011

OTHER PUBLICATIONS

The International Search Report and the Written Opinion of the International Searching Authority for PCT/US2015/039664, ISA/RU, Moscow, Russia, dated Oct. 15, 2015.

(Continued)

*Primary Examiner* — Baotran N To
(74) *Attorney, Agent, or Firm* — M&B IP Analysts, LLC

(57) ABSTRACT

A system and method for adaptively securing a protected entity against cyber-threats. The method includes: activating a security application configured to handle a cyber-threat; receiving a plurality of feeds during a runtime of the security application; analyzing the plurality of received feeds to determine if the security application is required to be re-programmed to perform an optimized action to efficiently protect against the cyber-threat; and re-programming, during the runtime, the security application, when it is determined that the security application requires performance of the optimized action.

29 Claims, 7 Drawing Sheets

(56) References Cited

U.S. PATENT DOCUMENTS

| | | |
|---|---|---|
| 2003/0233567 A1 | 12/2003 | Lynn et al. |
| 2004/0114519 A1 | 6/2004 | MacIsaac |
| 2004/0143756 A1 | 7/2004 | Munson et al. |
| 2008/0086435 A1 | 4/2008 | Chesla |
| 2008/0167567 A1 | 7/2008 | Bashour et al. |
| 2008/0288430 A1 | 11/2008 | Friedlander et al. |
| 2009/0043724 A1 | 2/2009 | Chesla |
| 2011/0271341 A1 | 11/2011 | Satish et al. |
| 2012/0096549 A1 | 4/2012 | Amini et al. |
| 2012/0096551 A1 | 4/2012 | Lee et al. |
| 2012/0096552 A1 | 4/2012 | Paek et al. |
| 2012/0263382 A1 | 10/2012 | Robinson et al. |
| 2012/0304007 A1 | 11/2012 | Hanks et al. |
| 2012/0311132 A1 | 12/2012 | Tychon et al. |
| 2013/0091085 A1 | 4/2013 | Sohn et al. |
| 2013/0091150 A1 | 4/2013 | Jin et al. |
| 2013/0097662 A1 | 4/2013 | Pearcy et al. |
| 2013/0097706 A1 | 4/2013 | Titonis et al. |
| 2013/0174256 A1 | 7/2013 | Powers |
| 2013/0198840 A1 | 8/2013 | Drissi et al. |
| 2013/0276122 A1 | 10/2013 | Sowder |
| 2013/0333032 A1 | 12/2013 | Delatorre et al. |
| 2014/0053267 A1 | 2/2014 | Klein et al. |
| 2014/0068326 A1 | 3/2014 | Quinn |
| 2014/0181972 A1 | 6/2014 | Karta et al. |
| 2014/0215618 A1 | 7/2014 | Amit |
| 2014/0283026 A1 | 9/2014 | Amit et al. |
| 2014/0283050 A1 | 9/2014 | Amit |
| 2014/0331279 A1 | 11/2014 | Aissi et al. |
| 2014/0337974 A1 | 11/2014 | Joshi et al. |
| 2015/0058993 A1 | 2/2015 | Choi et al. |
| 2015/0128274 A1 | 5/2015 | Giokas |
| 2015/0242856 A1 | 8/2015 | Dhurandhar et al. |
| 2016/0241581 A1* | 8/2016 | Watters ............... H04L 63/1433 |

OTHER PUBLICATIONS

The International Search Report and the Written Opinion of the International Searching Authority for PCT/US2015/060109, ISA/RU, Moscow, Russia, dated Mar. 10, 2016.

EP Search Report and Examiner's Opinion for European Patent Application No. EP 15 821755.4 dated Oct. 2, 2017, EPO, Munich, Germany.

First Office Action for Chinese Patent Application No. 201580038953.X dated Jan. 11, 2018, SIPO, China.

* cited by examiner

CYBER-SECURITY SYSTEM AND METHODS THEREOF

CROSS-REFERENCE TO RELATED APPLICATIONS

This patent application is a continuation application of U.S. patent application Ser. No. 14/615,020 filed on Feb. 5, 2015, which claims the benefit of U.S. Provisional Application No. 62/085,844 filed on Dec. 1, 2014, and U.S. Provisional Application No. 62/026,393 filed on Jul. 18, 2014, the contents of which are hereby incorporated by reference.

TECHNICAL FIELD

The present disclosure generally relates to cyber security systems, and more particularly to real-time customizable and programmable cyber security systems for threat mitigation.

BACKGROUND

The Internet provides access to various pieces of information, applications, services, and vehicles for publishing information. Today, the Internet has significantly changed the way we access and use information. The Internet allows users to quickly and easily access services such as banking, e-commerce, e-trading, and other services people access in their daily lives.

In order to access such services, a user often shares his personal information such as name; contact details; highly confidential information such as usernames, passwords, bank account number, credit card details; and the like, with service providers. Similarly, confidential information of companies such as trade secrets, financial details, employee details, company strategies, and the like are also stored on servers that are connected to the Internet. There is a threat that such confidential data may be accessed by malware, viruses, spyware, key loggers, and various other methods of unauthorized access, including using legitimate tools (e.g., a remote desktop and remote processes services) that have been compromised to access or to install malware software that will allow access such information. Such unauthorized access poses great danger to unwary computer users.

Recently, the frequency and complexity level of attacks has increased with respect to attacks performed against all organizations including, but not limited to, cloud providers, enterprise organizations, and network carriers. Some complex attacks, known as multi-vector attack campaigns, utilize different types of attack techniques and target network and application resources in order to identify at least one weakness that can be exploited to achieve the attack's goals, thereby compromising the entire security framework of the network.

Another type of complex attack is an advanced persistent threat (APT). An APT is an attack in which an unauthorized hacker gains access to a network and remains undetected for a long period of time. The intention of an APT attack is usually to steal data rather than to cause direct damage to the network or organization. APT attacks typically target organizations in sectors with high-value information, such as the national defense, manufacturing, retail, and financial industries.

These attacks are frequently successful because modern security solutions are not sufficiently agile and adaptive with respect to detection, investigation and mitigation of resources needed to meet such evolving threats. Current security solutions cannot easily and promptly adapt to detect and mitigate new attack behavior, or attacks that change their behavior in a significant manner. In addition, current security solutions cannot easily and promptly adapt to new network technologies and topologies implemented by the entities to be protected.

For example, in modern computing platforms, such virtualization and software-defined networks (SDN) face real challenges to security systems. Such platforms host an enormous number of tenants with virtual distributed and dynamic resources. Each tenant can be removed or created in minutes and can be transformed into a malicious resource, thereby attacking its own "neighbors," tenants or remote network entities.

Specifically, currently available solutions suffer from drawbacks including, for example, programmability capabilities, automatic mitigation, and collaboration. For example, a security defense system that is not programmable becomes ineffective in a matter of a few days or even a few hours because such security systems fail to resist or adapt to any new attack behavior in time.

Security solutions, and in particular solutions for APT attacks, do not provide reliable automatic mitigation capabilities. Typically, APT security solutions are not designed for both detection and automatic mitigation. In addition, system administrators do not trust currently available APT security solutions due to the high level of false positive alerts generated by such systems. As a result of such false positive alerts, system administrators must often manually perform mitigation actions rather than permit automatic mitigation, which usually prolongs the time to mitigate attacks.

Moreover, current security solutions do not share attack information and detection, investigation and mitigation solutions between different companies due to the risk of revealing confidential data of a protected entity. This lack of communication limits the ability to adapt one security system using information related to attack behavior detected by another system in another organization or same organization, which would permit the security systems to promptly react to new threats by allowing a security system that has been subject to a new threat, and successfully addressed the threat, to provide information about the security functions or applications that were used.

It would therefore be advantageous to provide a solution that would overcome the deficiencies of the prior art cyber security systems by permitting readily adaptable and customizable cyber security system. It would be further advantageous if such a solution would automatically detect and mitigate incoming threats.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a method for adaptively securing a protected entity against cyber-threats. The method comprises: activating a security application configured to handle a cyber-threat; receiving a plurality of feeds during a runtime of the security application; analyzing the plurality of received feeds to determine if the security application is required to be re-programmed to perform an optimized action to efficiently protect against the cyber-threat; and re-programming, during the runtime, the security application, when it is determined that the security application requires performance of the optimized action Some embodiments disclosed herein also include a non-transitory computer readable medium having stored thereon instructions for causing a processing circuity to execute a process for adaptively securing a protected entity against cyber-threats, the process comprising: activating a security application configured to handle a cyber-threat; receiving a plurality of feeds during a runtime of the security application; analyzing the plurality of received feeds to determine if the security application is required to be re-programmed to perform an optimized action to efficiently protect against the cyber-threat; and re-programming, during the runtime, the security application, when it is determined that the security application requires performance of the optimized action Certain embodiments disclosed herein also include a system for adaptively securing a protected entity against cyber-threats, comprising: a processing circuitry; and a memory, the memory containing instructions that, when executed by the processing circuitry, configure the system to: activate a security application configured to handle a cyber-threat; receive a plurality of feeds during a runtime of the security application; analyze the plurality of received feeds to determine if the security application is required to be re-programmed to perform an optimized action to efficiently protect against the cyber-threat; and re-program, during the runtime, the security application, when it is determined that the security application requires performance of the optimized action.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
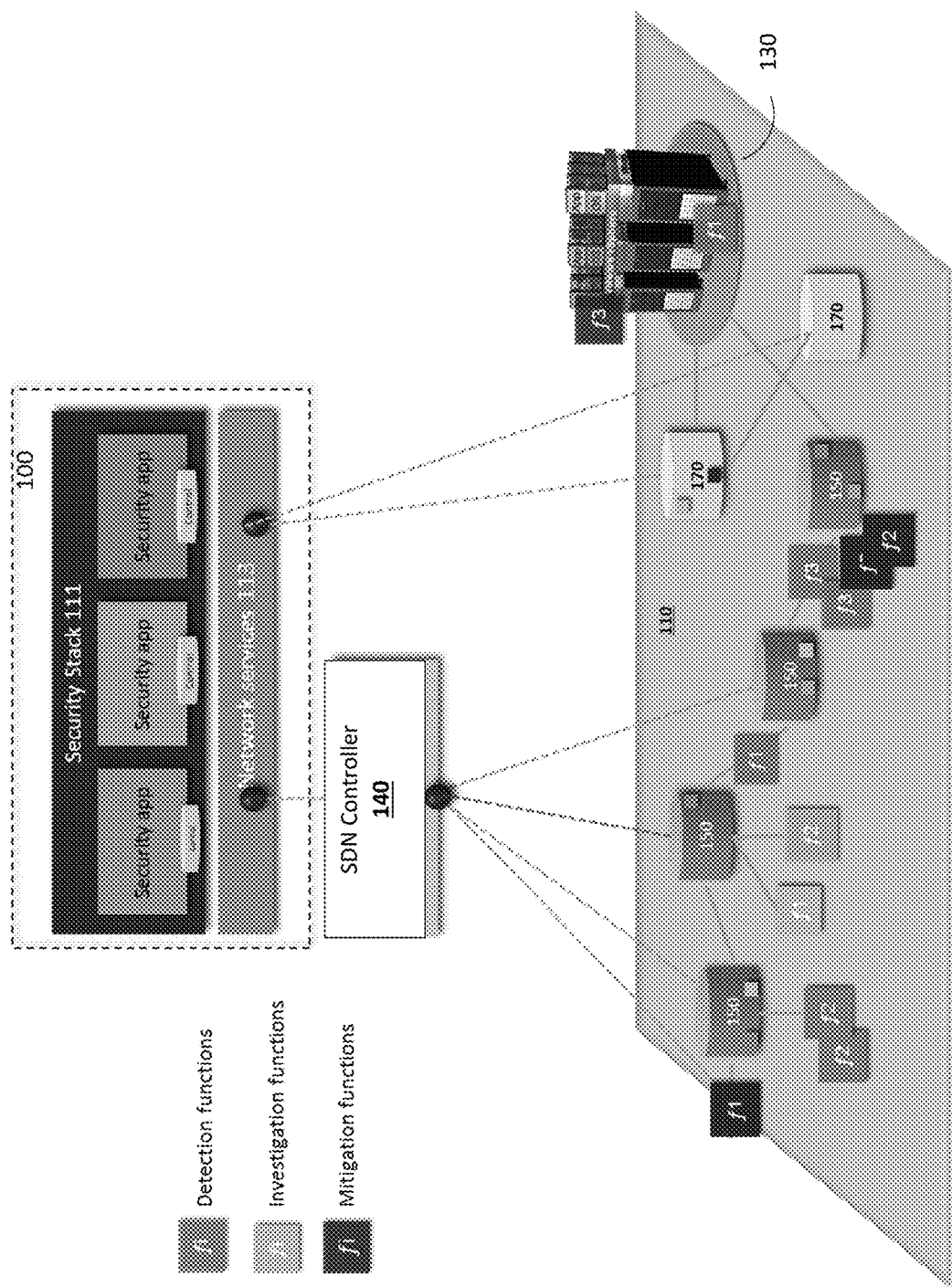
FIG. 1 is a diagram of a cyber-security system implemented according to one embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include cyber security systems and methods thereof. The disclosed embodiments are designed to secure protected entities. A protected entity may include, for example, a L2/3 network element, a server application (e.g., Web, Mail, FTP, Voice and Video conferencing, database, ERP, and so on), "middle box" devices (e.g., firewalls, load balancers, NAT, proxies devices, etc.), SDN controllers (e.g., OpenFlow controllers and virtual overlay network controllers), and personal computing devices (e.g., PCs, laptops, tablet computers, smartphones, wearable computing devices, a smart TV, and other devices with internet connectivity (also known as IoT).

In some configurations, the protected entity may be deployed or otherwise accessed through various computing platforms. As noted above, computing platforms may include, but are not limited to, virtualized networks and software defined networks (SDN). The disclosed cyber security system is configured to detect and mitigate multi-vector attack campaigns that carry advanced persistent threat (APT) attacks, web injections attacks, phishing related threats, misuse of applications and server resources, denial-of-service (DoS) and distributed DoS (DDoS) attacks, business logic attacks, violations of access policy, and so on. The APTs include, but are not limited to, malware command and control, and malware spreading. The business logic types of attacks include, but are not limited to, network intelligence gathering such as network scans, application scans, and web scraping types of attacks. The disclosed cyber security system is designed to achieve comprehensive protection by providing a programmable, customizable, and adaptive architecture for responding to cyber threats.

In an embodiment, the disclosed cyber-security system is arranged as a layered model allowing the system to adapt to changes in the protected entity and to ongoing attack campaigns. In one embodiment, the cyber security system provides the ability to create, define, or program new security applications, to modify the functionality of existing applications, and to easily correlate and create workflows between multiple applications. A security application defines how to detect and mitigate a threat to the protected entity, which specific resources should be utilized for the protection, where the protection should take place, and so on. In an embodiment, a security application can be defined using a set of security services discussed in more detail below.

The security applications and services can be shared or collaborated across different cyber security systems of the same or different companies. In an embodiment, security applications can be saved in a central repository, thereby allowing system administrators to import applications to their systems or to export applications that have been developed. It should be noted that a plurality of security applications can be utilized to detect and mitigate an on-going attack campaign.

FIG. 1 is an exemplary and non-limiting diagram of a cyber-security system 100 implemented according to one embodiment. The cyber-security system 100 is configured to protect an entity (hereinafter a "protected entity") 130 communicatively connected in a network 110. The cyber security system 100 is also connected to the network 110.

The network 110 may be, but is not limited to, a virtualized network, a software defined network (SDN), a hybrid network, a cloud services networks, or any combination thereof.

An SDN can be implemented in wide area networks (WANs), local area networks (LANs), the Internet, metropolitan area networks (MANs), ISP backbones, datacenters, and the like. Each network element in the SDN may be a router, a switch, a bridge, a load balancer, a DPI device, and so on, as well as any virtual instantiations thereof. Typically, elements of the SDN include a central SDN controller 140 and a plurality of network elements 150. In certain implementations, the central SDN controller 140 communicates with the network elements 150 using an OpenFlow protocol which provides a network abstraction layer for such communication; a Netconf protocol which provides mechanisms to install, manipulate, and delete the configuration of network devices; and so on. In an exemplary configuration, the network 110 may be a hybrid network in which a SDN is a sub-network of a conventional network in which its elements cannot be programmed by a central SDN controller.

In one embodiment, the security system 100 interfaces with the network 110 through the central SDN controller 140. In another embodiment, the functionality of the cyber-security system 100 can be integrated in the central SDN controller 140. Alternatively, the functionality of the cyber-security system 100 operates directly with the network elements in the data-plane (or it can be a mix of the above). This allows implementing security functions in various locations in the network 100 (SDN, Legacy (non-SDN) networks, or hybrid networks) to protect the protected entity 130.

In an embodiment, security functions are programmed by the cyber-security system 100 to perform detection, investigation, and mitigation functions (labeled as f1, f2, and f3, respectively, in FIG. 1). The functions are executed during different phases of the operation of the cyber-security system 100, i.e., detection, investigation, and mitigation phases and independently programmed by the cyber-security system 100. It should be noted that some or all the functions (f1, f2, and f3) can be implemented or otherwise performed in the network 110.

In an exemplary implementation, the cyber-security system 100 includes a security stack module 111 and a network interface module 113. The security stack module 111 is configured to control and execute the various phases to protect the protected entity 130. Specifically, the security stack module 111 is configured to create, control, program, and execute the security functions (f1, f2, and f3) through a plurality of security applications or "apps." The operation of the security stack module 111 is discussed in greater detail herein below with respect to FIG. 2.

The network interface module 113 provides an interface layer of the cyber-security system 100 with the central SDN controller 140 to allow commutation with SDN-based network elements 150. In another embodiment, the network interface module 113 also communicates with "legacy" network elements 170 in the network 110. Non limiting examples for communication drivers that allow for configuration, control, and monitoring of legacy network elements include, but are not limited to, border gateway protocol, (BGP) flow specifications, NetConf, command line interfaces (CLIs), NetFlow, middle-box devices drivers (e.g., L4-L7 drivers, DPI device drivers), end point device drivers (mobile, host based security applications), server applications, and so on.

Figure 2:
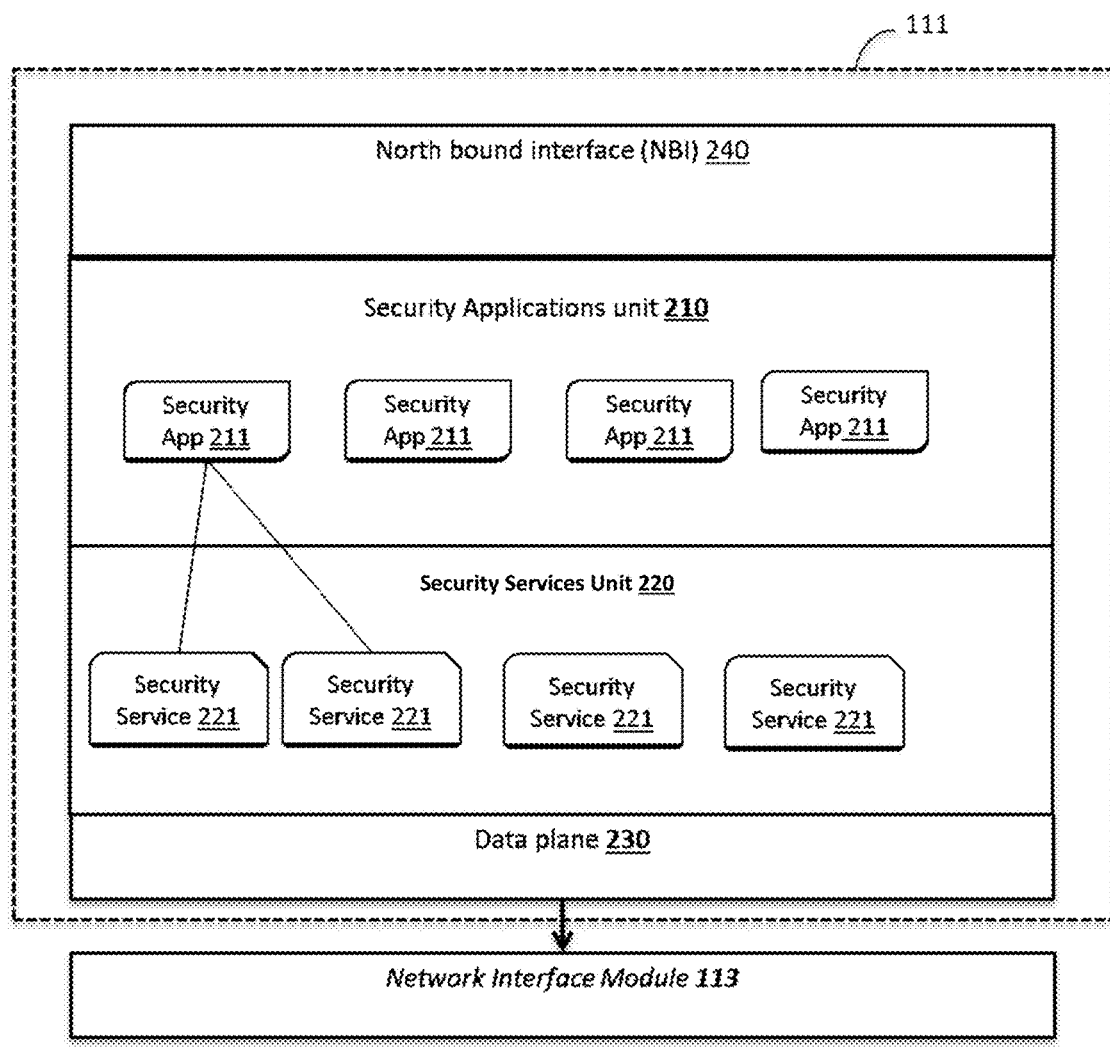
FIG. 2 is a block diagram of a security stack module implemented according to one embodiment.

FIG. 2 shows an exemplary and non-limiting block diagram of the security stack module 111 implemented according to one embodiment. In an exemplary implementation, the security stack module 111 includes the following units: a security application unit 210, a security services unit 220, a data-plane unit 230, and a northbound network interface (NBI) 240. The security stack module 111 includes security services 221 that are reusable across different security applications 211. Thus, different security applications 211 (each one for different purpose) can consume the same security services 221 for their own needs.

Specifically, the security application unit 210 includes the security applications (apps) 211. Each security application 211 represents a different type of security protection or function including, for example, APT detection and mitigation, low and slow attacks protection, reputation security intelligence, web page scraping detection, mitigation, and so on. The modules or functions interfacing with a security application provide the required services allowing the creation or otherwise updating of a security application according to evolving security needs.

In an embodiment, the security application unit 210 is preconfigured with a set of security applications 211. Additional security applications 211 can be added and removed from the security application unit 210 as needed. In an embodiment, all security applications 211 hosted in the security application unit 210 implement pre-defined APIs in order to efficiently communicate with the security services 221.

The security services unit 220 includes different types of security services 221. Each security service is designed to host multiple security decision engines and to serve one or more security applications 211. The security services 221 are also designed to provide efficient control over security functions (f1, f2, and f3) in the network data-plane.

Each security service 221 includes programmable security decision engine(s). The system 100 can use a set of pre-defined engines, import engines, and/or create a new security decision engine and share (export) an engine. The creation and modification of such engines can be performed through a programming language. The engines, and therefore the security services, can allow the cyber-security system 100 to adapt to new threats, new attack behaviors, unknown behaviors, or attacks that utilize new evasion techniques.

Following are exemplary and non-limited security services 221 that can be maintained and executed by the security services unit 220. A first type of security service provides programmable anomaly detection of network activities toward the network elements (e.g., toward routers, switches misuse of bandwidth resources, and so on).

Another type of security service provides programmable anomaly detection of network activities toward the server applications (e.g., Web, mail, FTP, VoIP, on so on). Another type of security service provides programmable detection of users' anomalous activities.

Another type of security service allows for managing and analyzing of multiple types of reputation sources (third party intelligence security sources). The service allows creation of a self-generated reputation database that can become a reputation source for other security applications and for third party security systems. The reputation database maintains reputations of sources. Such reputations may be used to identify third party security applications that are less likely to contain threats than other applications.

Another type of security service allows programming advanced challenge-response actions that validate the legitimacy of users' applications. Yet another type of security service allows control for multiple types of sandbox functions in the network (mixing-and-matching the best functions for each task) in order to analyze content such as web objects, mails attachments, executable files, and so on, and to identify anomalous code behavior. This type of service also allows creation and modification of sandbox analysis rules for analysis optimization.

Yet another type of security service generates real-time (RT) attack (or anomaly) fingerprints. These real-time attack fingerprints represent network traffic patterns of attacks, such as user-based attacks (e.g., malware generated network traffic activities), server-based attacks (e.g., web scraping network activities, brute-force network activities, etc.) and network-based attacks (e.g., network Distributed Denial of Service (DDoS) attacks network activities). These real-time attack fingerprints can be used for real-time mitigation of threats, as well as for reputation and forensic analysis.

Yet another type of security service allows for management of multiple types of attack signatures databases (DBs) (for example, third party intrusion attack signature databases), integration and/or injection of the relevant attack signature into data-plane DPI functions, and monitoring of the results in a way that can be managed by the security application or by other security services.

Yet another type of security service allows mapping a source IP address to a network user identity. This service may be communicatively connected to the north bound interface 240 in order to query the information from third party identity management systems.

It should be noted that programmability of the security stack module 111, as enabled by the architecture of the system 100, allows a user to select different types of security services, thereby providing a mix and match capability. Specifically, this capability is achieved by the data plane unit 230 and a network interface module 113 which provides an abstraction layer for all underlining data-plane functions in the network (such as routers, switches, DPI devices, sandbox servers, challenge-response servers, and so on).

Information that is needed for operation of the security services 221 may be retrieved from the data-plane unit 230 and/or from the north bound interface 240. It should be noted that the security services in the unit 220 also communicate and interface with the security applications unit 210 (the security applications unit 210 controls and manages the security services 211 in the security services unit 220).

It should be further noted that the security services listed above are merely examples and other services can be utilized in the cyber-security system 100 according to the embodiments disclosed herein. In various non-limiting embodiments, a programming language is provided in order to allow users to create and modify security applications and to create and modify the engines contained in each security service, as per business needs.

The data-plane unit 230 provides central management of the data-plane resources such as routers, switches, middle-box devices, and so on. In an embodiment, the data plane unit 230 allows the security services to retrieve and store the required network and application information from the data plane resources as well as to enforce security network control actions. Various functions provided by the data plane unit 230 include topology discovery, traffic monitoring, data collection, traffic redirection, traffic distribution (L2, L3 load balancing for scaling out resources), traffic copy, and so on.

Topology discovery involves interacting with the data-plane network elements, SDN controllers, and orchestration systems in order to retrieve network topology information. This function is important for the topology awareness that is needed by other data-plane's functions as well as security services and applications.

The redirection and scale functions are designed to manage all network traffic redirection functions which include, but are not limited to, traffic redirection, smart traffic copying, traffic distribution, and so on.

The data collection may involve collecting statistics data from the probes and storing such statistics. Statistics collection may include, but is not limited to, network-based statistics from network elements; application-based network statistics from DPI resources (including middle-boxes and servers); and user-based statistics from network, DPI, middle boxes, and end-point resources. The monitor and collector services normalize the statistical information into a format that can be analyzed by the security services 221 in the security services unit 220.

The data-plane unit 230 further provides the following functions: management of quality of service (QoS) actions in the network elements, and a set of mitigation functions. The mitigation functions include basic access control list (ACL) services, which are layer-2 to layer-4 access control list services that manage the distributed rules throughout the network elements. Software defined networks, as well as legacy network elements and hybrid networks, may be supported by this service.

Advanced ACL functions possess similar characteristics to basic ACL functions, but can define more granular access rules including application parameters (L7). Specifically, an ACL function can use the generated RT fingerprints from a real-time fingerprint generation service (discussed before) as a blocking rule. The ACL function typically operates with DPI network elements for enforcing the application level ACL rules. Service rate-limits manage the QoS rules in the data plane device. Black-hole route function provides an extension of the redirection data-plane services that manage redirection of users into a black-hole. Typically, black holes are network locations where incoming or outgoing traffic is silently discarded (or "dropped"), without informing the source that the data did not reach its intended recipient).

In an embodiment, the data-plane services allow both real-time detection and "near" real-time detection. Real-time detection of attacks is facilitated by feeding the statistics directly from the data-plane collectors, in real-time, to the security services unit 220 without storing the raw stats (i.e., storing only the result in the security services unit 220). In general, the data-plane unit 230 provides all raw information that is required by the security services 221 and controls the network via decisions made by the security services 221 and security applications 211.

In some exemplary implementations, certain functions provided by the data-plane unit 230 can be implemented in the central SDN controller 140. Examples for such functions may include, but are not limited to, redirection, monitoring, and data collection.

The north bound interface 240 interfaces between the security stack module 111 and one or more external systems (not shown). The external systems may include, for example, third party security analytics systems, security intelligence feeds, security portals, datacenter orchestration control systems, identity management systems, or any other system that can provide information to the security stack module 111. This enables a wider context-based security decision making processes. In an embodiment, the interfaces 240 may include standard interfaces, such as CLI, REST APIs, Web user interface, as well as drivers that are already programmed for control, configuration and/or monitoring of specific third party systems, and so on. The north bound interface 240 also interfaces with network interface module 113.

In an exemplary and non-limiting embodiment, the security services 221 may include, but are not limited to, a network anomaly security service 221-1, a user application anomaly security service 221-2, a sandbox security service 221-3, a reputation security service 221-4, a user identity security service 221-5, attack signatures security service 221-6, a challenge-response security service 221-7, a real-time fingerprint generation security service 221-8, an anti-virus (AV) security service 221-9, and a Web application (WAF) security service 222-10.

The network anomaly security service 221-1 is a near real-time service that is programmed to analyze user-based network behavior. In an embodiment, the network anomaly security service 221-1 includes a user profile data structure and a set of decision engines programmed to continuously generate user-based scores of anomaly (SoA). A SoA is a security signal that can be correlated by a security application 211. A high SoA reflects a user network behavior anomaly that characterizes different types of network-based attacks, such as network pre-attack probes scanning activities (intelligence gathering), malware (L3/L4 network level) propagation activities, low and slow misuse of TCP stack resource attacks, abnormal user communication channels, and so on. In an embodiment, any detection performed by the service 221-1 is performed in a near real-time. To this end, the network anomaly security service 221-1 is programmable to generate a complex event-processing design model that does not store long-term user data.

The user application anomaly security service 221-2 is programmed to continuously learn the network and application connections activities of a user (or a group of users). In an embodiment, the service 221-2 implements one long-term (e.g., at least 12 weeks) of adaptive baseline per traffic parameter. The user profile data structure of this service aggregates L3-L7 parameters as well as application meta-data and continuously generates base lines for each parameter (or for multiple parameter function such as traffic ratio), including 24 by 7 (24×7) differentiated baselines, i.e., storing base line per time and day in the week.

The user application anomaly service 221-2 includes a set of security engines programmed by a set of engine rules. A user can modify and program new security engines by defining a new set of engine rules. Each engine is programmed to continuously generate SoA per each user or users group. High SoA reflects unusual user application activity, such as communication with drop points, communication with command and control servers, malware propagation activities, application brute-force, application scans, user-misbehaving applications (e.g., fake applications), and so on. A drop point provides internal and external drop-points/zones that are used as part of advanced information stealth attack campaigns. A detailed block diagram of the user application anomaly service 221-2 is provided in FIG. 4.

In an embodiment, both network and user application anomaly services 221-1 and 221-2 can be programmed to generate SoAs that correlate signals from other security services 221. Such correlation is performed by a set of engine rules discussed in greater detail below.

The sandbox security service 221-3 is programmed to selectively select the required sandbox function required to analyze content, such as web objects, mails attachments, executable files, and the like. The sandbox security service 221-3 is configured to control and manage the sandbox function resources as well as to analyze their outputs.

The reputation security service 221-4 is configured to allow managing and analyzing of multiple types of reputation sources (e.g., third party intelligence security sources). The reputation security service 221-4 allows creation of a self-generated reputation database that can become a reputation source for other security applications 221 and for third party security systems. For APT threat detection, the analysis and management of reputation information is focused on phishing sites, bad reputation malware sites, drop points, and credit card servers. The user identity security service 221-5 allows mapping source IP address to network user identity. To this end, the user identity security service 221-5 can query an identity management system.

The attack signatures security service 221-6 is configured to allow management of multiple types of attack signature databases (DBs), such as third party intrusion signatures databases, to integrate/inject the relevant attack signatures to data-plane DPI functions, and to monitor the results in a way that can be managed by the security app 211 or by other security services 221. The security service 221-6 also allows management and control of third party data plane devices, such as network intrusion detection services (NIDS) and network intrusion prevention services (NIPS) in the data-plane. In order to allow APT threat detection, client vulnerability-based attack signatures are managed by the attack signatures security service 221-4.

Other types of security services 221 that can be used to detect APT threats include, but are not limited to, a user challenge-response security service 221-7 that is configured to allow the programming of advanced challenge-response actions that validate the legitimacy of users' applications, and a user real-time fingerprint generation security service 221-8, which is responsible for analyzing detected anomaly parameters (e.g., an anomaly that was detected by the user application anomaly service) and to create, in real-time or near real-time, a fingerprint that characterizes the anomaly. Such fingerprints can be used for real-time investigation and mitigation of threats, as well as for reputation and forensics analysis.

It should be noted that the security services 221 listed above are merely examples and other services can be utilized in the system 100 according to the embodiments disclosed herein. In various non-limiting embodiments, a programming language is provided in order to allow users to create and modify security applications and to create and modify the engines contained in each security service 221, on case-by-case basis.

Figure 3:
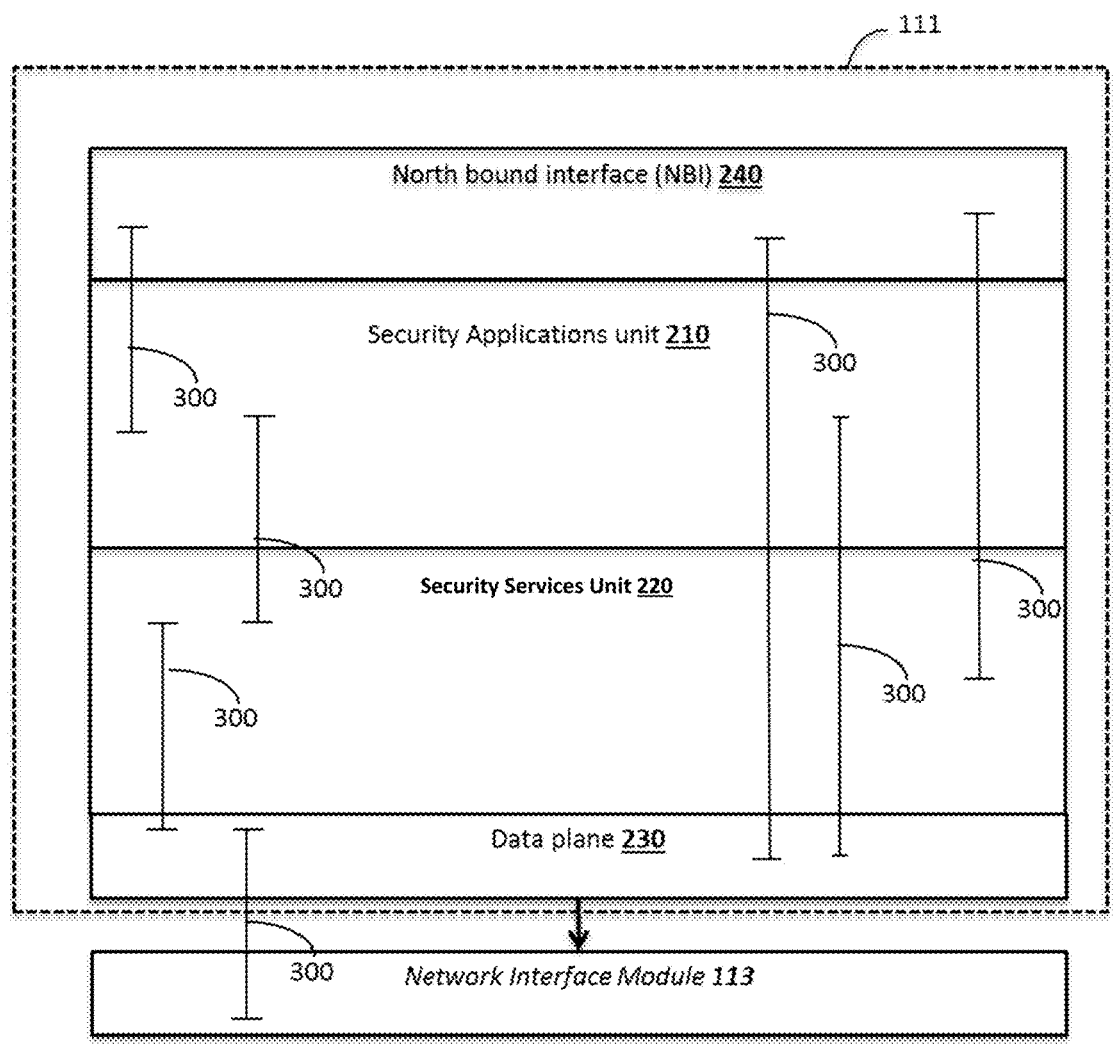
FIG. 3 illustrates the communication interfaces between the various units of the security stack module.

Furthermore, as shown in FIG. 3, each unit 210, 220, 230, and 240, as well as the security stack module 111, are communicatively interconnected through a predefined set of interfaces and/or APIs (collectively labeled as interfaces 300). As a result, the cyber-security system 100 is fully programmable and configurable. The interfaces 300 may be designed to be unidirectional, bidirectional, or one-to-many bi-directional flows of information between the various modules and units.

It should be noted that modules in the cyber-security system 100 and the units 210, 220, and 230 in the security stack module 111 are independent. Thus, any changes in one unit or module do not necessarily result in any changes to the other modules.

According to an embodiment, the cyber-security system 100 is designed to activate/deactivate, and correlate between security applications in unit 210 and security services in the unit 220, in order to define, create, or otherwise program a robust solution for detecting and mitigating attacks against the protected entity. The sequence for activating, deactivating, and correlating the various functions and modules of the cyber-security system 100, is based on one or more workflow rules. In an embodiment, the detection, investigation and/or mitigation functions are performed in the system 100 based on at least one workflow rule defined to handle a certain threat.

At a top level, the correlation model allows each security application to correlate feeds received from other security applications, thereby making the entire security decision-making process more holistic and context-based, i.e., correlating decision outputs from different security application types before making a final security decision.

To this end, each security application may communicate with other security applications and services by means of a controller managing the correlation of the different feeds.

At a lower level, the correlation of feeds occurs between multiple security services. This allows a single security application to make decisions based on multiple services in order to increase the overall decision accuracy.

According to one embodiment, the correlation of various feeds is performed by a set of workflow (or correlation) rules which are processed and applied by a controller of a security application. In an embodiment, the set of workflow rules are defined by the user. In another embodiment, the controller implements a learning mechanism to define or otherwise select a set of correlation rules to execute. The workflow rules are set respective of the attacks that the cyber-security system 100 can handle. That is, in an exemplary implementation, a set of workflow rules is defined for each different type of threat.

Each, some, or all of the modules of the cyber-security system 100 and the various units of the security stack module 110 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 4:
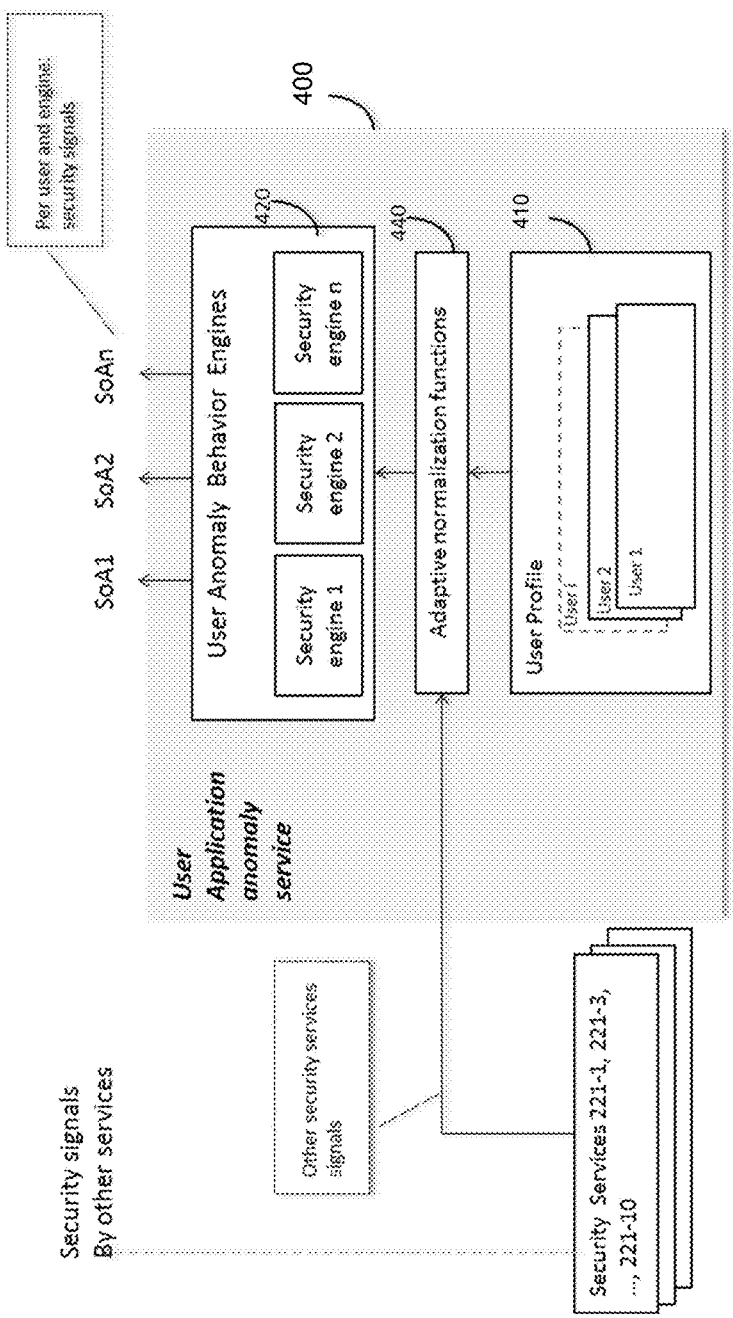
FIG. 4 is a block diagram of a user application anomaly security service according to an embodiment.

FIG. 4 shows an exemplary block diagram of a user application anomaly security service acting as the security service 400 according to one embodiment. The user application anomaly security service 400 is a cornerstone in detecting APT attacks, as hackers often gain access to a network and remain undetected for a long period of time by exploiting legitimate users in the network and assuming typical behavior of such users.

The security service 400 includes a user profile module 410, a plurality of user anomaly behavioral engines 420, and a set of normalization functions 440. The user profile module 410 is configured to store and compute baseline parameters for the user activity over a predefined period of time (e.g., between 4 to 12 weeks). The user profile module 410 typically stores baselines of each user traffic parameter as well as baselines of multiple parameters function (e.g., ratios of inbound vs. outbound traffic parameters, relative portions of application traffic parameter, relative frequency, and so on).

In an embodiment, each profile stored in the user profile module 410 is structured to include two sections: classification, and characteristics. The classification section includes user traffic classification parameters in a hierarchical structure. Each hierarchy level is defined as a "flow-path." The characteristics section includes dynamic characteristics of traffic parameters per each classification flow-path. The characteristics of a traffic parameter include real-time values and baselines of rate-variant and rate-invariant parameters. As a non-limiting example, a flow-path may define an end-to-end traffic path between two network entities in different granularity levels. The classification of the flow-path may be based on, for example, a source identity, a destination identity, a protocol type, a layer-4 port, an application type, a browser type, an operating system, and the like. The characteristics of the traffic parameters include, for example, packet per second (PPS), connections per second (CPS), a packet size, a number of concurrent connections, a flow data symmetry (upload/download ratio), a request type (e.g., browser type requests vs. API call), and so on.

The user anomaly behavior engines 420 are configured to generate, based on engine rules and a respective user profile, one user-based score of anomaly (SoA) per user. To compute a SoA for a user, real-time and adaptive baselines of a user are retrieved from the user profile module 410 and each parameter therein is normalized by adaptive normalization functions 440. As noted above, each parameter or set of parameters has its own adaptive normalization function 440. The adaptive normalization functions 440 are tuned by the adapted base lines in a time interval (typically one hour). Each adaptive normalization function 440 generates a parameter deviation weight in a format that can be processed by the user anomaly behavior engines 420. The adaptive normalization functions 440 are also responsible for normalizing signals from other security services The computed SoAs are provided to a security application 211, which decides, based on the programmed workflow and workflow rules, an action to be executed. Such an action may include, for example, initiate an investigation phase, remain in detection phase, collect more information, activate another service or engine, and so on.

As shown in FIG. 4, the user application anomaly behavior security service can also correlate outputs (signals) of other security services (e.g., services 221). A typical output will be correlated with outputs from reputation, attack fingerprints, sandboxes, and services (discussed in detail above). The outputs of the security services (e.g., services 221) may be integer values, Boolean values, and so on. The values are normalized by the adaptive normalization functions into a format that can be processed by the user application anomaly security service engines.

In an exemplary implementation, such as for example, an implementation configured to detect APT attacks, the user application anomaly security service 400 is configured with a set of user anomaly behavior engines 420. Each user anomaly behavior engine 420 is programmed to evaluate or detect user behavioral anomalies caused due to APTs' activities. These anomalies may include, but are not limited to, unusual geographic communications (e.g., users communicating with new geographical locations); unusual user communication with specific destinations; unusual content types consumed by a specific application (e.g., binary content being consumed by Facebook® or Twitter® accounts); users' connections with unusual traffic symmetry (e.g., unusual upload or download activities, clients that act like servers, etc.); unusual user application behavior based on bandwidth consumption and/or connection consumption; repetitive or similar behavior patterns of a user's connection across different destinations; users that unusually communicate with the same destination and with a similar connection pattern; users' unusual time-based activity (e.g., 24/7 activity) based on parameters such as connection, bandwidth, destinations, application type, and so on; cross-users connection behavior similarity; unusual periodic client communication in same intervals to the same target; and so on.

The user anomaly behavior engines 420 can also be configured to detect or evaluate anomalies related to applications executed on a user device. Such anomalies may include, for example, unusual DNS traffic (e.g., too many DNS query from the same client, same size of DNS requests from the same client), fast flux behavior (e.g., a single domain that is represented by multiple dynamically changed IP addresses); non-real HTTP traffic over typical HTTP ports; unusual usage of web email servers; unusual browser types usage; and unusual point-to-point traffic patterns. In an embodiment, each user anomaly behavior engine 420 generates a SoA that quantifies the deviation of the user's or user group's behavioral parameters from the norm as determined respective of a profile maintained in the user profile module 410. The SoA may be in a form of an integer value, a Boolean value, a level (e.g., high, low, medium), or any other form that measure level of activity. The SoA is continuously generated and, therefore, can be changed over time and used to measure trends of anomaly scores.

In an embodiment, the SoA is generated by a set of engine rules that can be processed by each engine in a security service 221. The engine rules typically include one or more of: a set of Boolean operators (AND, OR, NOT, etc.); a set of weight levels (Low, Mid, High); and so on. Following are non-limiting examples for engine rules for user abnormal protocol usage:

1. IF user L4 dest port flow [BPM is Very High OR CPM is Very High] THEN HIGH SOA
2. IF user L4 dest port flow [Aggregated bytes is High AND CPM is Normal] THEN LOW SOA
3. IF user L4 dest port flow [Aggregated Bytes is Very High] THEN HIGH SOA The BPM is a number of bytes per minute, the CPM is the number of L4 connections per minute, and the aggregated bytes is the number of bytes of the user's flow in a relatively long period (e.g., 1 hour). The "user L4 destination (dest) port flow" defines the scope of flows which the rule's parameters apply to (in this case, all parameters apply to destination L4 connection flows, this flow is defined as an aggregation of all of the user's L4 connections with the same destination port number).

The 'high' and 'low' values are configurable. The parameters "Aggregated bytes", CPM", and "BPM" are part of the user application profiles. The generated SoA (signals) are fed to the security application 211. The security application can translate the generated SoAs into a security event fed to the application's workflow rules. For example, a high SoA value may be translated into a security event, while a low SoA value may not translate into a security event.

Figure 5:
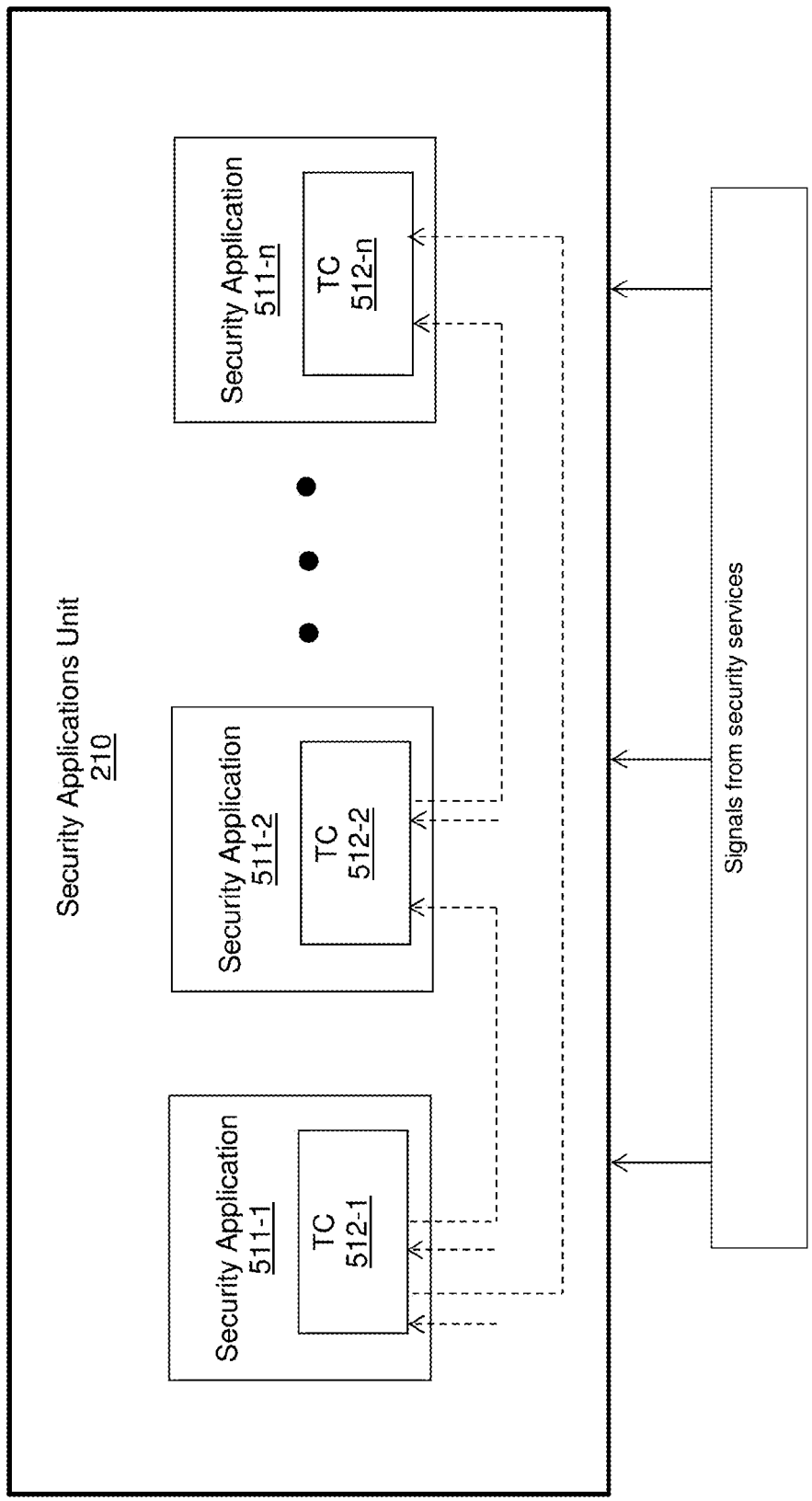
FIG. 5 is a schematic diagram illustrating utilization of security services in a security applications unit according to an embodiment.

FIG. 5 shows an exemplary and non-limiting schematic diagram illustrating the utilization of security services in a security application unit according to one embodiment. The security applications unit 210 includes a plurality of security applications 511-1 through 511-n (hereinafter referred to collectively as security applications 511 and individually as a security application 511, merely for simplicity purposes. Each of the security applications 511 may further include a top controller (TC) 512.

Each top controller 512 is configured to send and receive alerts to and from other security applications 511. As a non-limiting example, the top controller 512-1 may send alerts to and receive alerts from security applications 511-2 through 511-n. Each of the top controllers 512 subscribes to at least one security application 511. A subscribed security application 511 is a security application 511 that the top controller 512 may send alerts to or receive alerts from.

In the embodiment shown in FIG. 5, the top controller 512-1 is at least subscribed to security applications 511-2 and 511-n. Similarly, in the embodiment shown in FIG. 5, the top controller 512-2 is at least subscribed to security applications 511-1 and 511-n, and the top controller 512-n is at least subscribed to security applications 511-1 and 511-2.

In an embodiment, a master top controller (e.g., the top controller 512-1) is configured of activating and deactivating security applications 511 via other top controllers 512. To this end, the master top controller is configured with a set of workflow rules. The master top controller typically subscribes to each security application 511 associated with another top controller 512.

The various security services 221 (not shown in FIG. 5) output security signals to the security applications 511. The security signals may be generated in response to detection of malware activity, protocol usage anomaly, a drop of point behavior, a network scan behavior, and so on.

An example for such signals is the SoA described above. An application checks if one and/or any combination of the received signals satisfy at least one event rule. The event rules are further correlated to check if they satisfy a workflow rule. Events that satisfy at least one workflow rule will trigger an action such as, but not limited to, a mitigation action, an investigation action, and so on. The processes for checking and correlating rules are further described in FIG. 6.

Figure 6:
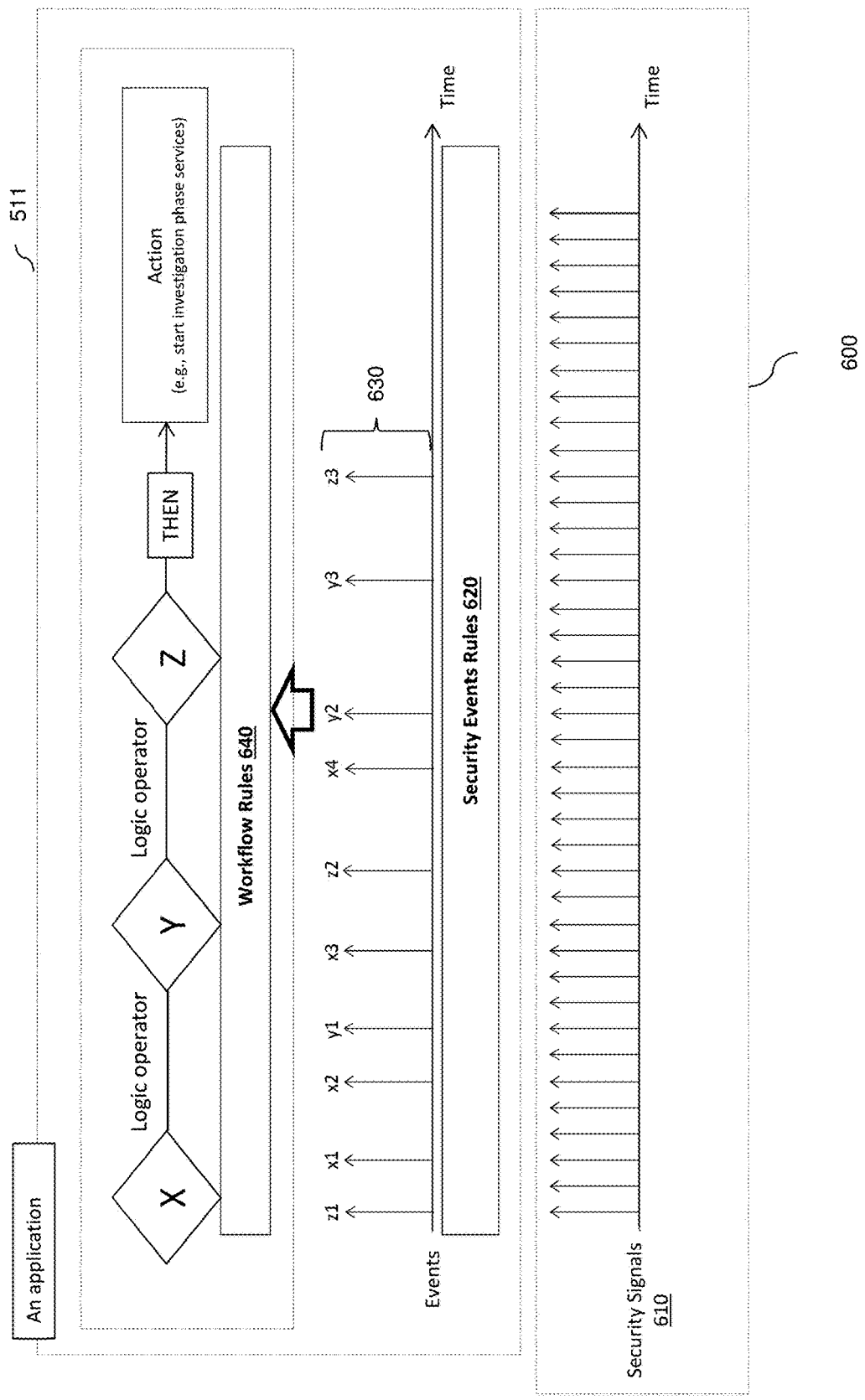
FIG. 6 is a schematic diagram illustrating checking of security signals based on event rules according to an embodiment.

As shown in the exemplary and non-limiting FIG. 6, a security service 600 generates and outputs security signals 610. The security service 600 may be any of the security services noted above. The security signals 610 are fed to a security application 511 that checks if one and/or any combination of the received security signals 610 satisfy at least one security event rule 620. The security signals 610 may be generated in response to detection of malware activity, protocol usage anomaly, a drop point behavior, and so on. In an embodiment, each signal is generated with a "context" attribute that maps the signal into the relevant application(s) and relevant event rule(s) 620. The signal context attributes are configured by the security application when the security application 521 is created.

In an embodiment, the event rules 620 can be applied to a signal value, a duration, a frequency, and so on. In an embodiment, the security signal 610 is in a form of a pulse. The security signal 610 may be generated by a security decision engine (not shown) programmed to monitor for users that send information into an internal drop zone network entity.

In this embodiment, the security event rules 620 define that, if the pulse is high (high SoA) for a duration of more than 25 seconds, then a security event 630 is triggered. Following are non-limiting example for event rules:

IF <H> SoA time=> <10 m> in-period <24 h> THEN event <10 m/24 h internal drop point behavior>

IF <H> SoA <High risk source> occurrences=>5 THEN event <High risk user drop point behavior)

Where, <H> refers to high range of SoA values and <High risk source> refers to any network entity that maintain highly confidential information.

Referring back to FIG. 6, the security events 630 are generated respective of the security signals 610 received from the security service 600 and matched to the security rules 630. In an embodiment, each event rule processes the relevant signal and generate a security event 630 accordingly. Processing of security signals includes different types of functions, such as a simple signal counter, an exponential moving counter, a signal period identification function, a frequency function, and so on.

The security events 630 are correlated by the security application 511 using the workflow rule 640. As noted above, security events 630 that satisfy at least one workflow rule 640 will trigger an action such as, but not limited to, a mitigation action, an investigation action, and so on. As an example, a workflow rule 640 can correlate between a reputation event and a user anomaly event. In an embodiment, the workflow rules 640 can be defined for the different phases of the operation of the system security application 511, i.e., a detection phase, an investigation phase, and a mitigation phase.

A conditional workflow rule may be defined using the following exemplary syntax:

IF <event <network-entities> <attributes>> <exp.p> <logical operator> <event [attributes]> <exp.p> <scope> . . . THEN <action(s)>

A non-conditional workflow rule may be defined using the following exemplary syntax:

<event <network-entities>>

This type of non-conditional rule is typically used for events that represent a security function, such as, but not limited to, an ACL, a challenge-response, a RT fingerprint service, and the like. Each of the network entities defined in a conditional or non-conditional rule may be any physical or logical network entity. Such entities include, but are not limited to, a range of IP addresses, a sub-net, a host, a domain name, user name, VPNs, and the like. An 'event' parameter is either a triggered security event or a specific security function (e.g., an investigation, or mitigation function such as ACL, Challenge-response function, and so on). The 'attributes' list a set of network attributes that are associated with the generated event (e.g., source identity, destination identity, destination L4 port, L7 protocol, application, etc.). The 'exp.p' parameter sets an expiration period in seconds, minutes, hours, and days. The rule can further define one or more Boolean operators, such as OR, AND, NOT, AND-THEN (AND-THEN which defines a time dependency between events). The action parameter defines at least one action to be performed if the rule is satisfied. The action may be, for example, a start service, a stop service, report, terminate all services, create a group event, and so on.

Following are a few non-limiting examples for a workflow rule in the detection phase:

IF <scan probe> AND <manual probe> THEN group event <Probe>, report "group event called 'probe' created"

In the above example, a new security event that combines two security events (the manual pre-attack probe event and automatic scanning event) is created. The group event represents, in this case, significant pre-attack probes activities. A group event allows for simplification of the language because one can write the next rules with a fewer number of event objects In the second example, the workflow rule activates a mitigation service if one of the users has been detected as having a high SoA that represents a user behavior that sends information to drop-point.

IF probe AND-THEN drop-point <source=probe-destination> THEN start service <mitigation>

Figure 7:
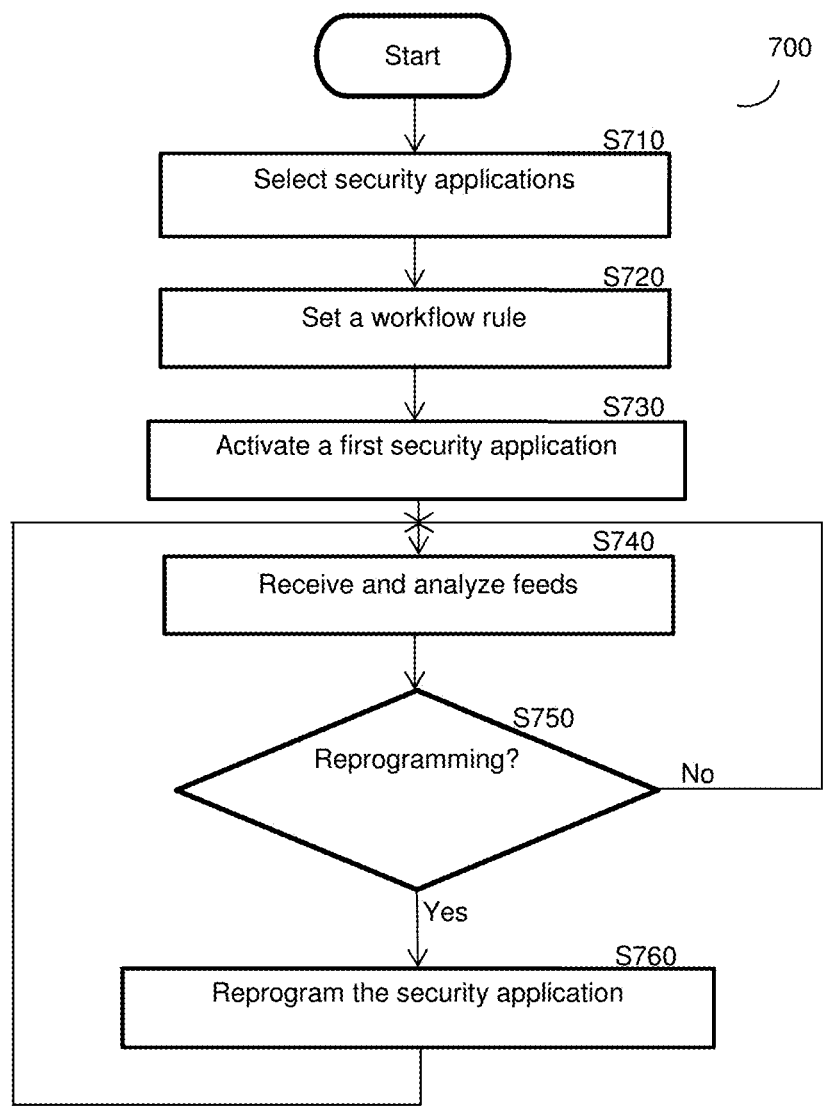
FIG. 7 is a flowchart illustrating the operation of the cyber security system according to one embodiment.

FIG. 7 is an exemplary and non-limiting flowchart 700 illustrating the operation of a cyber-security system according to one embodiment. The disclosed method provides dynamic security processes, implemented by the cyber security system, in which decisions with regard to detection and mitigation of threats are performed based on sets of conditions that various security applications and services are configured with. These conditions define, in part, what event would trigger a different phase of protection such as, but not limited to, detection, investigation, and mitigation.

At S710, one or more security applications to be utilized for a protection of the protected entity are selected. The selection may be performed based on the threat to handle, a level of service that the owner of the protected entity is subscribed to, external protection considerations, and so on. The threats that the security applications, and hence the cyber-security system 100, can handle include, but are not limited to, APT attacks, web injections attacks, phishing related threats, misuse of applications and server resources, DoS and DDoS attacks, business logic attacks, and violations of access policy. The APT attacks may include, but are not limited to, malware command and control, and malware spreading. The business logic type of attacks may include, but are not limited to, network scans, application scans, and web scrapping types of attacks.

As noted above, each security application may be included or otherwise executed a set of security services. Thus, one or more security services to be executed by each application are selected as well. For example, if the security services $S_1$, $S_2$, and $S_3$ are defined respective of a first security application $SA_1$ and a second security application $SA_2$, each of these services may be included in a security application to be executed. That is, the first security application $SA_1$ may include $S_1$ and $S_3$; while the second security application $SA_2$ may include services $S_2$ and $S_3$. In an embodiment, one, some or all of the security services assigned to an application are executed in the foreground, while the rest of are executed in the background. As will be discussed in detail herein, services can be always added to a security application during its runtime.

At S720, at least one workflow rule is set. The workflow rule defines in part an activation sequence for security services or functions. For example, an application SA1, a service $S_1$ can initially run in the foreground and $S_3$ can run in the background. Upon determination that $S_3$ is required, then execution of $S_3$ can be initiated in the foreground. The workflow rule may be set by a user (e.g., an administrator) or automatically by a user upon selection of the appropriate security application.

At S730, the security application is activated and executed by the security system. The security application operates to detect, investigate and/or mitigate threats as discussed in detail above. The activation of action in response to the execution of the security application is determined by the at least one workflow rule.

At S740, various feeds received during the runtime of the application are received and analyzed. Such feeds may include signals (e.g., SoAs) generated by security services, risk intelligence feeds, and the like. The risk intelligence feeds may be provided by a security service configured to detect new threats or from external systems communicatively connected to the cyber-security system.

At S750, it is checked if the analysis of such feeds should trigger the reprogramming of the security application. For example, if a new threat has been detected or the attack scale has been increased and the initially assigned security services cannot efficiently handle such cases, then security application should be re-programmed. Other feeds that may trigger the re-programming of the security application include identification that the protection mechanisms provide by the security application do not efficiently operate. If S750 results with a 'yes' answer, application continues with S760, where a reprogramming process of the security application is performed; execution returns to S740.

According to an embodiment, S760 includes determining which security services (or engines executed therein) are required to improve the security application; assigning such security services to the security application; setting new or modifying existing event rules to correlate signals generated by newly assigned services; setting new or modifying existing workflow rules to handle the events generated by the newly added services; programming new engines operable within running security service(s); activating new engines operable within a running security service(s); and activating the new security services.

In one embodiment, the new security services may be pre-configured in the security services unit 220 or imported from a different cyber-security unit or a repository. The selection of the new security services may be performed by a user or suggested by the system.

In a further embodiment, additional security services can be seamlessly assigned and executed by the security application without modifying event rules and/or the workflow rules initially set (e.g., at S720). According to this embodiment, any new security service and/or its respective engines are assigned with a unique tag. The security application can process the event rules while considering the signals output by the new service and/or its respective engines. The signals may be also tagged. For example, a SoA signal can be tagged with a unique tag "A10232" of a new security service and evaluated by an event rule:

IF H SOA (tag A10232) time=>10 m in period 24 h THEN
   event "drop point behavior"

Each SoA signal with the unique tag will be processed by one of two methods: persistent, where SoA is processed separately by the event rule or additively where all SoA signals with the same tag are processed together, as if they were arrived from the same security service and/its respective engines. That is, two or more engines using the same tag generate a SoA signal that will be processed by the same event rule. Furthermore, when a security service and/or its respective engine(s) with the same tag is added, the workflow rule does not need to change as well as the same workflow rule processes resulted events. Thus, cyber-security system disclosed herein can execute new security services and/or engines without updating the event and/or workflow rules.

It should be noted that, due to the architecture of each security stack module (e.g., the module 111), the execution of new services does not require halting the operation of the security application.

In an embodiment, the security application and services defined therein can be programmed by a user through a set of graphical interfaces or through a predefined set of templates. This would allow users to provision, configure, and control the security services in the security stack, create new security applications or engines, modify existing security applications and engines, and more.

As a non-limiting example for the operation of the method disclosed herein, a security application includes a first security service configured to detect an abnormal activity, a second service configured to investigate the abnormal activity, and a third security service configured to mitigate an attack. Specifically, the first security service is configured to detect a range of source IP addresses from the Internet that are acting in an anomaly manner (e.g., seems like a "user-password" cracking brute force activities). A workflow rule defines that the first service is configured with indicates that, when suspicious sources are detected, the second security service is triggered.

As an example, the second service evaluates the sources according to their most relevant reputation DB and finds a match with a high score (e.g., some of the sources are known to be bad-reputation bot sources). The trigger for the third service, as defined by the workflow rule, is a detection of such high score. The third service provides a mitigation action such as, for example, via implementation of Distributed ACLs. This application is programmed to retrieve the most updated network topology information and implement ACLs at the point (or distributed points) that are nearest to the network access. Access is restricted for a pre-defined period.

It should be noted that different security applications and/or services can be executed in parallel. It should be further noted that more than one security application can be executed in each phase of operation. Furthermore, multiple security applications from different domains or disciplines can be executed in parallel.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C"

or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for adaptively securing a protected entity against cyber-threats, comprising:
   activating a security application configured to handle a cyber-threat;
   receiving a plurality of feeds during a runtime of the security application;
   analyzing the plurality of received feeds to determine if the security application is required to be re-programmed to perform an optimized action to efficiently protect against the cyber-threat; and
   re-programming, during the runtime, the security application, when it is determined that the security application requires performance of the optimized action;
   wherein the optimized action includes at least a mitigation action.

2. The method of claim 1, wherein the optimized action further includes an investigation action.

3. The method of claim 1, wherein the security application is from a plurality of security applications, wherein each of the plurality of security applications is configured to handle a different type of cyber-threat, and wherein the at least one security application is configured to execute a first set of security services assigned to the at least one selected security application.

4. The method of claim 3, wherein each of the plurality of feeds includes a signal generated by a security service of the first set of security services.

5. The method of claim 4, wherein each risk intelligence feed indicates any one of: a new cyber-threat and a modification of the cyber-threat.

6. The method of claim 5, wherein each security service in the first set of security services is at least one of: a network anomaly security service, a user application anomaly security service, a sandbox security service, a reputation security service, a user identity security service, an attack signatures security service, a challenge-response security service, a real-time fingerprint generation security service, an anti-virus security service, and a Web application security service.

7. The method of claim 1, wherein analyzing the plurality of received feeds further comprises:
   checking if the cyber-threat is in a state that requires any one of: investigating the cyber-threat and mitigating the cyber-threat.

8. The method of claim 3, further comprising:
   checking if each security service of the first set of security services is optimized to at least investigate or mitigate the cyber-threat.

9. The method of claim 3, wherein re-programming the security application further comprises:
   assigning a second set of security services to the security application; and
   configuring the security application to execute the second set of security services, wherein the second set of security services is optimized to perform the optimized action.

10. The method of claim 3, further comprising:
    re-programming at least one security service of the first set of security to defend against the cyber-threat.

11. The method of claim 1, further comprising:
    saving at least one of the reprogrammed security application and the security application in a central repository, thereby allowing sharing of each saved security application with at least one cybersecurity system.

12. The method of claim 11, wherein each of the reprogrammed security application and the security application is imported to the at least one cybersecurity system.

13. The method of claim 12, wherein the cyber-threat is at least an on-going multi-vector attack campaign.

14. The method of claim 1, wherein the security application is deployed in any computing environment including the protected entity regardless of security systems operable in the computing environment.

15. A non-transitory computer readable medium having stored thereon instructions for causing a processing circuitry to execute a process for adaptively securing a protected entity against cyber-threats, the process comprising:
    activating a security application configured to handle a cyber-threat;
    receiving a plurality of feeds during a runtime of the security application;
    analyzing the plurality of received feeds to determine if the security application is required to be re-programmed to perform an optimized action to efficiently protect against the cyber-threat; and
    re-programming, during the runtime, the security application, when it is determined that the security application requires performance of the optimized action;
    wherein the optimized action includes at least a mitigation action.

16. A system for adaptively securing a protected entity against cyber-threats, comprising:
    a processing circuitry; and
    a memory, the memory containing instructions that, when executed by the processing circuitry, configure the system to:
    activate a security application configured to handle a cyber-threat;
    receive a plurality of feeds during a runtime of the security application;
    analyze the plurality of received feeds to determine if the security application is required to be re-programmed to perform an optimized action to efficiently protect against the cyber-threat; and
    re-program, during the runtime, the security application, when it is determined that the security application requires performance of the optimized action;
    wherein the optimized action includes at least a mitigation action.

17. The system of claim 16, wherein the optimized action further includes an investigation action.

18. The system of claim 16, wherein the security application is from a plurality of security applications, wherein each of the plurality of security applications is configured to handle a different type of cyber-threat, and wherein the at least one security application is configured to execute a first set of security services assigned to the at least one selected security application.

19. The system of claim 18, wherein each of the plurality of feeds includes a signal generated by a security service of the first set of security services.

20. The system of claim 19, wherein each risk intelligence feed indicates any one of: a new cyber-threat and a modification of the cyber-threat.

21. The system of claim 20, wherein each security service in the first set of security services is at least one of: a network anomaly security service, a user application anomaly security service, a sandbox security service, a reputation security service, a user identity security service, an attack signatures security service, a challenge-response security service, a real-time fingerprint generation security service, an antivirus security service, and a Web application security service.

22. The system of claim 16, wherein the system is further configured to:
check if the cyber-threat is in a state that requires any one of: investigating the cyber-threat and mitigating the cyber-threat.

23. The system of claim 18, wherein the system is further configured to:
check if each security service of the first set of security services is optimized to at least investigate or mitigate the cyber-threat.

24. The system of claim 18, wherein the system is further configured to:
assign a second set of security services to the security application; and
configure the security application to execute the second set of security services, wherein the second set of security services is optimized to perform the optimized action.

25. The system of claim 18, wherein the system is further configured to:
re-program at least one security service of the first set of security to defend against the cyber-threat.

26. The system of claim 16, wherein the system is further configured to:
save at least one of the reprogrammed security application and the security application in a central repository, thereby allowing sharing of each saved security application with at least one cybersecurity system.

27. The system of claim 26, wherein each of the reprogrammed security application and the security application is imported to the at least one cybersecurity system.

28. The system of claim 27, wherein the cyber-threat is at least an on-going multi-vector attack campaign.

29. The system of claim 16, wherein the security application is deployed in any computing environment including the protected entity regardless of security systems operable in the computing environment.

* * * * *